United States Patent [19]

Dixit et al.

[11] Patent Number: 4,994,927
[45] Date of Patent: Feb. 19, 1991

[54] SELF-ADAPTIVE NEURAL NET BASED VECTOR QUANTIZER FOR IMAGE COMPRESSION

[75] Inventors: Sudhir S. Dixit, Norwood; Yushu Feng, Worcester, both of Mass.

[73] Assignee: GTE Laboratories Incorporated, Waltham, Mass.

[21] Appl. No.: 368,489

[22] Filed: Jun. 19, 1989

[51] Int. Cl.⁵ .............................................. H04N 7/12
[52] U.S. Cl. .................................. 358/426; 358/133; 358/135
[58] Field of Search ............ 358/133, 122, 426, 261.1, 358/261.2, 261.3, 427, 261.4, 262.1, 428, 429, 430, 13, 135

[56] References Cited

U.S. PATENT DOCUMENTS

| | | | |
|---|---|---|---|
| 4,567,519 | 7/1986 | Richard | 358/135 |
| 4,780,761 | 10/1988 | Daly et al. | 358/133 |
| 4,791,654 | 12/1988 | De Marca et al. | 375/122 |
| 4,797,739 | 1/1989 | Tanaka | 358/133 |
| 4,797,945 | 1/1989 | Suzuki et al. | 358/455 |
| 4,851,906 | 7/1989 | Koga et al. | 358/136 |
| 4,853,778 | 8/1989 | Tanaka | 358/426 |
| 4,853,779 | 8/1989 | Hammer et al. | 358/135 |
| 4,862,261 | 8/1989 | Tanaka | 358/135 |
| 4,862,263 | 8/1989 | Strobach et al. | 358/133 |
| 4,903,317 | 2/1990 | Nishihara et al. | 358/426 |
| 4,922,508 | 5/1990 | Moriya | 358/133 |

OTHER PUBLICATIONS

Adaptive Vector Quantization of Video for Packet Switched Networks, Dixit, S. S. and Feng, Yushu, to be published in Proceedings of IEEE 1989 Int. Conf. on Acoustics, Speech and Signal Processing, Glasgow, May 23, 1989.

Vector Quantization of Images Based Upon the Kohonen Self-Organizing Feature Maps, Nasrabadi, N. M. and Feng, Yushu, Proc. Int. Neural Network Conf., Jul. 1988.

Primary Examiner—Edward L. Coles, Sr.
Assistant Examiner—Jerome Grant, II
Attorney, Agent, or Firm—Victor F. Lohmann, III; James J. Cannon, Jr.

[57] ABSTRACT

A self adaptive neural net based vector quantizer for image compression uses a conventionally designed small front-line code book and a larger second-line code book of vectors which quantize the space finely. Only the front-line code book is used for encoding. The front-line and second-line vectors are connected in a neural net, their strength of interconnection dictated by their correlation. Vectors are exchanged between code books on a periodic basis. The movement of a vector is dictated by a rising function for second-line vectors and a falling function for front-line vectors, which functions are computed from interconnections weights, average error and frequency of usage. After a periodic exchange of vectors, the affected nodes on the neural net are recomputed. Thus, the front-line code book is periodically revised to adapt to the images being coded.

2 Claims, 2 Drawing Sheets

SELF-ADAPTIVE NEURAL NET BASED VECTOR QUANTIZER FOR IMAGE COMPRESSION

BACKGROUND OF THE INVENTION

This invention pertains to the compression of images for transmission over networks and their reconstruction upon reception. In particular, it pertains to a neural net based adaptive vector quantizer which does not require any side information to be sent, yet the code vectors that are sent are optimized to the characteristics of the actual image being coded.

Vector quantization has been applied to speech coding for a number of years. However, the application of vector quantization to image coding is relatively new. Vector quantization for reducing bit-rate has been found to be a very efficient technique due to its inherent ability to exploit correlation between neighboring pixels. Vector quantization has been applied both in the spatial and transformed domain in various forms. In its basic form, as illustrated in the block diagram of FIG. 1, an image is divided into blocks of N×N pixels. In the transmitter and receiver identical code books 15 exist whose entries contain combinations of pixels in a block 16. Assuming that there are M shades of gray in an image, theoretically, (M)$^{N \times N}$ combinations are possible. In practice, however, there are only a limited number of combinations that occur most often, which reduces the size of the code table or code book considerably. The code book is created by training it over a large set of test images of different types. During the coding process, each block of the actual image 10, being compressed is compared 12 with entries 14 in the code book 15, and the address of that entry, which best matches using the nearest neighbor rule, is transmitted 16 to the receiver. On the receive side, the received address is used to fetch 17 the same block 14 from the code book 15, which is then used to reconstruct the image 19. Typical block 14 and code book 15 sizes that are used are 4×4 and 256, respectively. Since it takes 8 bits to address an entry in the code book, a compression factor of 16 or bit rate of 0.5 bit per pixel is achieved, assuming that the original image is made up of 256 shades of gray. U.S. Pat. No. 4,797,739 issued to Tanaka is representative of the prior art.

Two major problems of vector quantization are: how to design a good code book that is representative of all the possible occurrences of pixel combinations in a block, and how to find a best match in the code book during the coding process. Some researchers have suggested various clustering techniques to design good code books. Tree searched algorithms have been used to speed up the code vector search process. A good overview of vector quantization can be found in Gray, IEEE ASSP Magazine, April 1984, pp. 4–29.

Typically, a fixed code book is used to encode all images. However, each image has its own characteristics, and it would seem optimal to design a code book which dynamically adapts to the actual image being coded. The invention relates to a neural network method to do exactly that, i.e., to first change the code book dynamically, and then encode the image.

Whereas neural network clustering techniques have been utilized in a number of applications, e.g., speech recognition and pattern recognition, its application to image compression is practically nonexistent. Nasrabadi and Feng (Vector quantization of images based upon the Kohonen Self-organizing feature maps, Proc. Int. Neural Network Conf., July 1988) have attempted to use a neural network clustering algorithm to design a vector quantization code book. This algorithm, better known as the Self-Organizing Feature Maps, enables a reduction in the dimensionality of the input vector space into a smaller number of dimensions. A set of extensively interconnected nodes, also called a network, represents the code book, and after the network has adapted itself to the input test vector patterns, the output of these nodes become the centroids of the clusters of the input vectors presented. The disadvantages of this technique are that it is computation intensive, and does not produce results that are any better than those produced by traditional vector quantization approaches.

Generally, researchers in neural net field employ a single-layer perceptron to do linear classification, as shown in FIG. 2, $$y = f\left( \sum_{i=0}^{N-1} w_i x_i - \theta \right) \qquad (1)$$

It is readily seen that the above formulation represents a feedforward function. However, to do non-linear classification, using a single layer perceptron without any hidden layer, we will have to do system adaptation. Finite state vector quantizer (FSVQ) (R. L. Baker and H. Shen, "A finite-state vector quantizer for low rate image sequence coding, Proc. ICASSP, pp. 760–763, April 1987), on the other hand, determines the most probable class, among a large number of classes of vectors, from its neighborhood information. This determination is made by using a state variable to specify characteristics of the previously coded blocks in the neighborhood and the previously coded vector. Classification of the current vector to be encoded dictates which code book to use (from a multiplicity of code books) for improved performance:

$$\text{Class} = f(x_{i-1}, S_{i-1}) \qquad (2)$$

where $S_{i-1}$ and $x_{i-1}$ denote the state and the vector variables, respectively.

Instead of employing a state function to estimate the class of a vector being encoded, we employ a neural net to bring the most probable code vector into the set of code vectors making up the code book.

SUMMARY OF THE INVENTION

The present invention is an improved, self-adaptive neural net based vector quantizer which overcomes the difficulties discussed above. In a first aspect of this invention, the vector quantizer employs a feedback as well as a feedforward function to do non-linear classification, as opposed to only utilizing feedforward function described above. A code book is first designed, using the LBG method to represent common characteristics of all types of images. This code book becomes the front-line of the coding system. The second-line code book is populated by those vectors (of the training images) which, when matched with the front-line code vectors, exceed a certain threshold. Only the front-line code table is used for coding. However, some code vectors move from the front-line code table to the second-line code table and an equal number of code vectors move in the opposite direction during the encoding process. The front-line vectors $v_i$ and second-line code vectors $v_j$ are interconnected through a neural net, and their strength of interconnection, $w_{ij}$, is dictated by their correlation. There is associated with each vector, in both the code tables, an average coding error, $e_k$, which is determined during the training process. The movement of a code vector from one code table to the other is dictated by a rising function for front-line vectors and a falling function for second-line vectors, which are functions of the interconnection weights, $w_{ij}$, the average error associated with that vector, $e_k$, and the frequency of usage of that code vector, $n_k$, Rising function: $F_{Vj} \sum_i f(w_{ij} e_i n_i)$  (3)

Falling function: $F_{Vi} \sum_j f(w_{ij} e_j n_j)$  (j)

During the coding process, an actual image vector is coded by the front-line code table in the usual manner, and the usage counter of the matched code vector is incremented by one. At periodic update intervals, the rising (falling) scores are calculated for each vector in the second-line (front-line) code table. A set of vectors with the largest rising scores (in the second line) is moved to the front-line code table, and an equal number of vectors with the least falling scores (in the front-line) are moved down to the second-line code table. The neural net is recomputed to account for the movement of the the two vectors. This is done both in the transmitter and the receiver. There is no need to send any side information to enable update in the receiver. The above process is repeated at update intervals. The quality of the coded image is improved because of the ability of the algorithm to track the local statistics of the actual image vectors being coded.

DETAILED DESCRIPTION

This invention pertains to a self-adaptive neural-net-based vector quantizer for image compression which does not require side information to be sent to a receiver for reconstruction of the compressed image. The code vectors that are sent are optimized to the characteristics of the actual image. To achieve these results, the approach employs a feedback as well as a feedforward function to do the non-linear classification, as opposed to only utilizing the feedforward function described above. Furthermore, the approach differs from others in the sense that it does not use a hidden layer.

Figure 1:
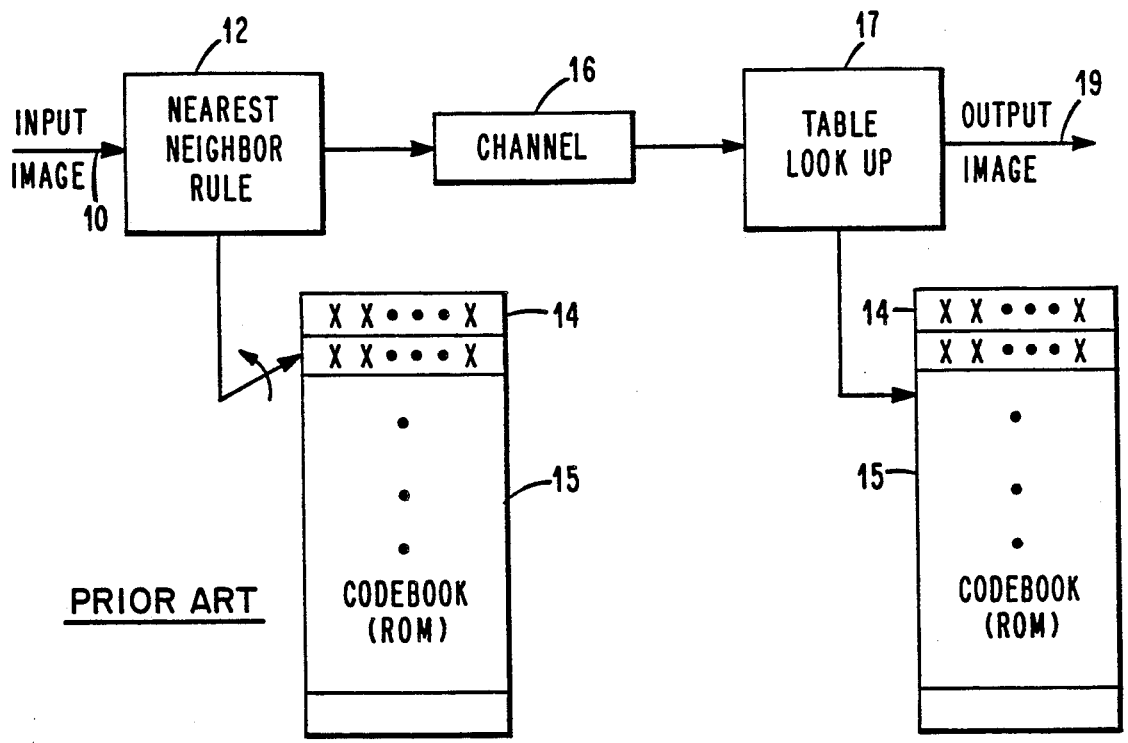
FIG. 1 is a block diagram of a typical vector quantization process of the prior art.
Figure 2:
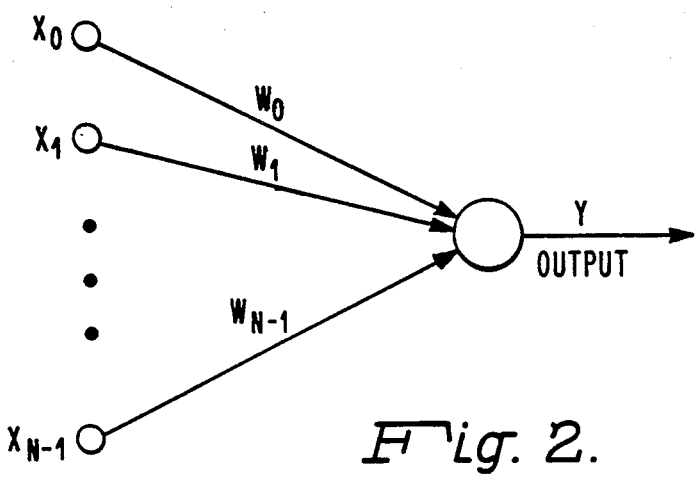
FIG. 2 is a diagram of a single layer perceptron.
Figure 3:
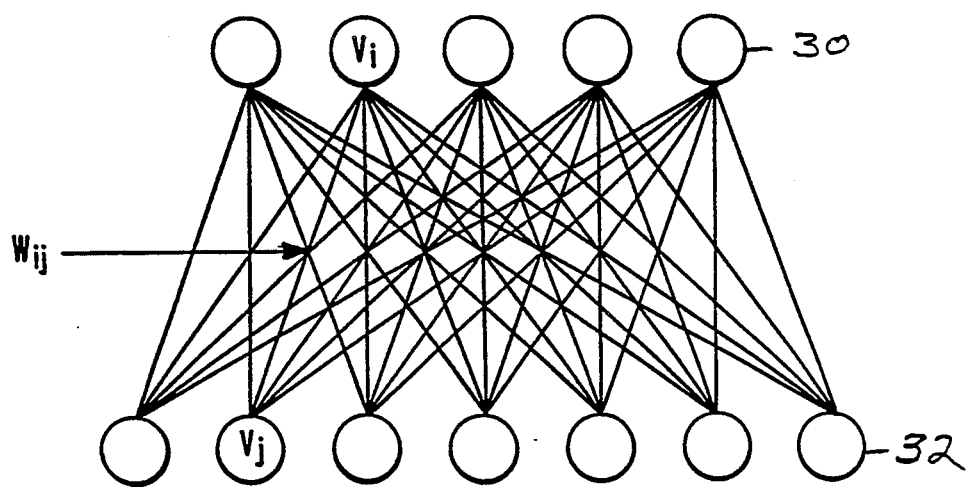
FIG. 3 is a schematic diagram of a neural-net-based adaptive vector quantization scheme according to the invention.

FIG. 3 is a schematic illustration of an adaptive vector quantization system based on a neural net. A code book is first designed, using the LBG method to represent common characteristics of all types of images. This code book contains the front-line vectors 30 of the coding system. A code book for the second line vectors 32 contains those vectors (of the training images) which, when matched with the front-line code vectors, exceed a certain threshold, which is specified. Threshold here refers to the distortion measure, e.g., the euclidean distance. Only the front-line code table is used for coding. However, code vectors may be moved from the front-line code table to the second-line code table and an equal number of code vectors may move in the opposite direction during the encoding process. The front-line vectors $v_i$ and second-line code vectors $v_j$ are interconnected through a neural net, as shown in FIG. 3, and their strength of interconnection (measured as a function of the euclidean distance), $w_{ij}$, is dictated by their correlation. There is associated with each vector $V_i$, $V_j$ in both code tables, an average coding error (which is a function of the matching error, e.g., the euclidean distance), $e_k$, which is determined during the training process. The movement of a code vector from one code table to the other is dictated by a rising function for second-line vectors and a falling function for front-line vectors, which are functions of the interconnection weights (normalized euclidean distance distortion measure), $w_{ij}$, average error associated with that vector, $e_k$, and the frequency of usage of that code vector, $n_k$:

Rising function: $F_{Vj} \sum_j f(w_{ij} e_i n_i)$  (3)

Falling function: $F_{Vi} \sum_j f(w_{ij} e_j n_j)$  (4)

where:
$V_i$ is the front line vector for the coding process;
$V_j$ is the second line vector;
$n_k$ is the coding frequency for the vector k, where $k=1,2,\ldots i,j$;
$e_k$ is the average coding error for the vector k.

During the coding process, an actual image vector is coded by the front-line code table in the usual manner, and rising and falling scores are calculated for each vector in both code tables, according to equations 3, and 4. A set of vectors with the largest rising scores in the second line 32 code table is moved to the front-line 30 code table, and an equal number of vectors with the least falling scores in the front-line 30 code table are moved down to the second-line 32 code table. The neural net is recomputed to account for the movement of the two vectors. This is done both in the transmitter and receiver. There is no need to send any side information to enable the update in the receiver. Every time a new vector is coded, this process is repeated. The quality of the coded image is improved because of the ability of the algorithm to track the local statistics of the actual image vectors being coded. For example, if a shape vector of 45° occurs frequently, after a few coding processes a 45° vector (of perhaps different intensity) would be moved from the second-line code table to the front-line code table, which will decrease the distortion in subsequent occurrences of the same vector.

The process of the present invention is fully described by the following algorithm.

(1) A code book of size N is designed, using any standard well-known technique, by training on a database of representative images. This code book now represents common characteristics of most images, and its entries will constitute the initial entries in the front-line code book at time $t=0$, when a coding process begins.

(2) Using the same set of test images as in step (1) another set of code vectors, numbering M, is designed to represent the initial entries in the second-line code book at $t=0$. Typically, $M>N$. This design is done as follows:
  (a) A large Table is defined to store image vectors, associated matching errors, and the frequency of their occurrences.

(b) Using a test image, the best match of the image test vectors is found from among the front-line code vectors, using some function of the distance measure, typically the distance itself. If the matching error (distortion measure), $e_i$, exceeds a certain pre-defined threshold (distortion), K, go to (c); else, go to (d).

(c) The test image vector is searched through a temporary large-sized Table to check if that vector already exists, and, if it does, then the associated counter for that vector is incremented by one, and, if that test image vector does not already exist, then, a new entry is created in the Table, the associated count entry is initialized by one, and the error entry is cleared to zero. Then, a check is made to see if all image vectors in all test images have been scanned. If yes, go to (e); else go to (b).

(d) The counter associated with the best matched code vector in the front-line code book is incremented, and the distortion error is added to the previously accumulated error for that code vector. Then, a check is made to see if all image vectors in all test images have been scanned. If yes, go to (e); else, go to (b).

(e) Now, to select M vectors (for the second-line code table) from the larger sized Table, a selection index $S_i$ is computed for each code vector in the large code book. $S_i$ is defined as:

$$S_i = f(e_i, f_i) \qquad (5)$$

where
$e_i$ = accumulated error for vector i, and
$f_i$ = frequency of occurrence of vector i.
Typically, $S_i$ is defined as $k_1 e_i + k_2 f_i$, where $k_1$ and $k_2$ are weighting factors such that $k_1 + k_2 = 1$. A more simple selection index can be defined as $S_i = f_i$.

(f) The code vectors in the large code book are sorted in the descending order of the selection index, $S_i$. The first M code vectors (with largest $S_i$ values) now constitute the second-line code table.

(g) Alternatively, the second-line code book can be designed using the same set of training images and the same code book design technique as the one used for designing the front-line code book.

(3) Next, an average coding (distortion) error is calculated for each vector in the two code tables. This is accomplished by utilizing the training images. Each vector in the training images is coded by finding a best match in either the front-line or second-line code table, and coding errors for each code vector are accumulated along with the number of times that code vector is used. These two values are then used to compute the average coding error. Average coding error and count value for each code vector are utilized in either rising or falling function computation.

(4) The vectors in the front-line and second-line code tables are interconnected through a neural net, as shown in FIG. 3. The interconnection weights are computed as the normalized euclidean distance between the two code vectors as described later.

It is to be noted that the vectors from the front-line are moved to the second-line and vice-versa in equal numbers at regular update intervals, requiring that the net be reconstructed periodically. Ideally, each vector in a certain code book is connected to every vector in the other code book. However, in practice, to speed-up the computation, either only a pre-defined number, typically four, of interconnections are made for each vector, or the number of interconnections established is made adaptive as a function of the desired quality. For example, to interconnect vector $v_i$ (in front-line code table) with vectors in the second-line, the following operations are performed.

a) A weight, $w'_{ij}$, between $v_i$ and $v_j$, is calculated which is a function of the distance between the vectors, and the difference between the shape of the two vectors (computed by determining the angular orientation), i.e., $$w_{ij} = f(\text{distance, shapes}) \qquad (6)$$

A simple measure of $w_{ij}$ can be the distance between the two vectors being interconnected. Second-line vectors are connected to the front-line vectors in the same way.

(b) Now, if only m interconnections are allowed for a vector ($v_i$) in the front line, m weights (M being the number of vectors in the second-line code table) are selected out of a total of M weights which have the smallest values, and $w_{ij}$ is computed as follows:

$$w_{ij} = w'_{ij} / (\Sigma w_{ij}) \qquad (7)$$

where
$w'_{ij}$ is the weight between the vector i in front-line and vector j in the second-line. Vector j is among those m vectors which have the smallest weights out of a total of M weights, $w'_{ij}$, j=1 to M. Summation is done over the m smallest weights.

Similarly, if only n interconnections are allowed for a vector ($v_j$) in the second-line, n weights are selected out of a total of N weights which have the smallest values, and $w_{ji}$ is computed as follows:

$$w_{ji} = w'_{ji} / (\Sigma w'_{ji}) \qquad (8)$$

where
$w'_{ji}$ is the weight between the vector j in the second-line and vector i in the front-line. Vector i is among the n vectors which have the smallest weights out of a total of N weights, $w'_{ji}$, i=1 to N. Summation is done over the n smallest weights.

Note that $w'_{ij} = w'_{ji}$, but $w_{ij} \neq w_{ji}$. Also note that the interconnection weights are recalculated after each update interval because some vectors are interchanged between the two code tables as described below.

However, our invention employs faster neural net interconnection schemes which would not require calculation of all of the weights in the two directions. Only those weights are recomputed which have been affected by the interchange of vectors in the two code books.

(5) A new image vector is coded by the front-line code book, and the index of that code vector is sent to the receiver. The usage count for that vector is incremented.

(6) Is complete image coded? If yes, to to 10; else, go to 7.

(7) Is this the time to update the neural net? If yes, go to 8; else go to 5.

8. The rising functions are calculated for each vector in the second-line code book, and the falling functions are calculated for each vector in the front-line code book. Then, a number of vectors (pre-defined or variable), depending upon the desired image quality, are selected from the second-line code book in the descending order of the magnitudes of the rising functions, and moved to the front-line code book. An equal number of vectors from the front-line code book are moved to the second-line code book. These vectors are selected in the ascending order of the magnitudes of the falling functions. It is to be noted that the ordering of the vectors in the two code books is not important.

(9) Reconfigure the net as described in 4 above. Go to 5.

(10) Exit. Return to main application or read the next frame and go to 5.

The invention described herein offers a number of new features and advantages:

1. A completely new approach to image compression;
2. The concept of node switching is novel and has not been disclosed before;
3. The technique offers flexibility in selecting the desired level of quality, the rate of adaptation, and the strength of adaptation;
4. The code tables are updated dynamically as an image is being compressed which enhances the image quality; and
5. The technique does not require any side information to be sent, resulting in higher compression.

What is claimed is:

1. A self-adaptive neural net-based vector quantizer for image compression comprising:
   a first code book, previously compiled in a training process from a set of test images, containing a set of front-line vectors to represent common characteristics of all types of images;
   a second code book, also previously compiled in a training process from said set of test images, containing a set of second-line vectors larger than said first set, which vectors, when matched with said front-line vectors, exceed a specified threshold in terms of euclidean distance;
   said front-line vectors and said second-line vectors being interconnected through a neural net wherein the strength of interconnection of any two vectors, one from each set, is determined by their euclidean distance, said strength of interconnection having been determined during said training process in the compilation of said code books from test images;
   each vector in each code book having an average coding error determined during said training process;
   means to download said code books to an image transmitting system and to an image receiving system;
   means to encode an image using vectors in said first code book and to send its code vectors to said receiving system;
   means to update the average coding error for each vector used to encode said image;
   means to retain a cumulative count indicating the frequency of use of each vector;
   means to periodically recompute the strength of interconnection among said first set of code vectors and said second set of code vectors;
   means to compute a rising function for each vector in said second set of code vectors based on said recomputed interconnection strengths, average coding error and frequency of use;
   means to compute a falling function for each vector in said first set of code vectors based on said recomputed strengths, average coding error and frequency of use;
   means to periodically exchange a preset number of code vectors having the largest rising function in said second code book with an identical number of code vectors having the smallest falling function in said first code book;
   means to recompute the neural net to account after said exchange of vectors between said two code books;
   whereby the first code book is adapted to the context of images being processed.

2. A method of encoding and decoding images using self-adaptive neural-net based-vector quantizer comprising the steps of:
   1. designing a set of vectors for a code book of size N, by any standard well-known technique by training on a database of representative images, said vectors representing common characteristics of most images, constituting the initial entries in a front-line code book at time t=0 when coding begins;
   2. using the same set of test images as in step 1, designing another set of code vectors, numbering M, representing the initial entries in a second-line code book at t=0; typically M>N, as follows:
      a. defining a large table to store image vectors, associated matching errors, and frequency of their occurrences;
      b. finding a best match of said image test vectors from among said front-line code vectors, using some function of the distance measure; if the distortion, $e_i$, exceeds a certain pre-defined threshold, K, go to c, else go to b;
      c. searching said test image vector through said temporary large-sized table to check if that vector already exists, and if it does, then incrementing the associated counter for said vector by one; and, if said test image vector does not already exist, then creating a new entry in said table, initializing the associated count entry by one, and clearing said error entry to zero; checking if all image vectors in all test images have been scanned; if yes, go to e, else go to b;
      d. incrementing the counter associated with said best matched code vector in said front-line code book, and adding said distortion error to said previously accumulated error for that code vector; checking if all image vectors in all test images have been scanned; if yes, to to e, else go to b;
      e. to select M vectors (for said second-line code table), from the large-sized table, computing a selection index, $S_i$, for each code vector in said large code book; $S_i$ being defined as:

$$S_i = f(e_i, f_i) \qquad (5)$$

where
   e = accumulated error vector i, and
   $f_i$ = frequency of occurrence of vector i
      f. sorting said code vectors in said large code book in descending order of said selection index, $S_i$; the first M code vectors (with largest $S_i$ values) constituting said second-line code table;

3. calculating an average coding error index $e_k$ for each vector in said two code tables by utilizing said training images; coding each vector in the training images is coded by finding a best match in either said front-line or said second-line code table, and accumulating said coding error for each code vector along with the number of times that code vector has been used; using these two values to compute the average coding error; utilizing said average coding error and count value for each code vector in either rising or falling function computation;

4. interconnecting said vectors in said front-line and second-line code tables through a neural net, by computing interconnection weights as the normalized euclidean distance between said two code vectors; such that interconnecting vector $v_i$ in said front-line code table with vectors in said second-line, by performing the following operations;
   a. calculating a weight, $w'_{ij}$, between $v_i$ and $v_j$, which is a function of the distance between said vectors; connecting second-line code vectors to said front-line code vectors in the same way;
   b. if only m selected interconnections are allowed for a vector ($v_i$) in said front-line, selecting m weights out of a total of M weights which have the smallest values, and computing $w_{ij}$ as follows:

$$w_{ij} = w'_{ij} / (\Sigma w'_{ij})$$

where
   $w_{ij}$ is the weight between the vector i in front-line and vector j in the second-line; vector j is among those m vectors having the smallest weights out of a total of M weights, $w'_{ij}$, j=1 to M; doing summation over the m smallest weights;
   if only n selected interconnections are allowed for a vector ($v_j$) in said second-line, selecting n weights out of a total of N weights having the smallest values, and computing $w_{ji}$ as follows:

$$w_{ji} = w'_{ji} / (\Sigma w'_{ji})$$

where
   $w_{ji}$ is the weight between a vector j in said second-line and vector i in said front-line; vector i being among said n vectors having the smallest weights out of a total of N weights, $w'_{ji}$, i=1 to N; doing summation over the n smallest weights;
   such that $w'_{ij} = w'_{ji}$, but $w_{ij} \neq w_{ji}$;
   c. recalculating said interconnection weights which have been affected by said interchange of vectors in said two code books after each update interval;

5. coding a new image vector is coded by said front-line code book, and sending said code vector's index to said receiver; and incrementing the usage count for that vector;

6. is complete image coded; if yes, go to 10, else go to 7;

7. is this the time to update the neural net; if yes, go to 8; else go to 5;

8. calculating the rising functions for each vector in said second-line code book, and calculating the falling functions for each vector in said front-line code book;
   selecting a number of vectors from said second-line code book in the descending order of the magnitudes of said rising functions, and moving said selected vectors to said front-line code book; moving an equal number of vectors from said front-line code book to said second-line code book, selecting these vectors in the ascending order of the magnitudes of the falling functions;

9. reconfiguring said neural net as described in 4 above, go to step 5;

10. exit (return to main or read the next frame, and go to step 5).

* * * * *